USo11860379B2

(12) United States Patent
Chen et al.

(10) Patent No.: US 11,860,379 B2
(45) Date of Patent: Jan. 2, 2024

(54) FAST ASSEMBLY METHOD OF AN OFFNER SPECTRAL IMAGING OPTICAL SYSTEM

(71) Applicant: SOOCHOW UNIVERSITY, Suzhou (CN)

(72) Inventors: Xinhua Chen, Suzhou (CN); Zhicheng Zhao, Suzhou (CN); Tuotuo Yang, Suzhou (CN); Jiacheng Zhu, Suzhou (CN); Weimin Shen, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 226 days.

(21) Appl. No.: 17/623,766

(22) PCT Filed: May 6, 2020

(86) PCT No.: PCT/CN2020/088839
§ 371 (c)(1),
(2) Date: Dec. 29, 2021

(87) PCT Pub. No.: WO2021/088341
PCT Pub. Date: May 14, 2021

(65) Prior Publication Data
US 2022/0244561 A1    Aug. 4, 2022

(30) Foreign Application Priority Data
Nov. 6, 2019    (CN) .......................... 201911078576.9

(51) Int. Cl.
*G02B 27/62*    (2006.01)
(52) U.S. Cl.
CPC .................................. *G02B 27/62* (2013.01)

(58) Field of Classification Search
CPC .............................. G02B 27/62; G01J 3/2823
(Continued)

(56) References Cited

U.S. PATENT DOCUMENTS 5,880,834 A    3/1999    Chrisp
6,118,577 A *   9/2000    Sweatt ................ G03F 7/70158
                                                     359/857

(Continued)

FOREIGN PATENT DOCUMENTS

CN    102141439 A    8/2011
CN    102519595 A    6/2012
(Continued)

*Primary Examiner* — Isiaka O Akanbi
(74) *Attorney, Agent, or Firm* — SZDC Law PC

(57) ABSTRACT

A fast assembly method of an Offner spectral imaging optical system. The Offner spectral imaging optical system is a concentric or nearly concentric optical system, that is, its primary mirror (7), convex grating (5) and three-mirror (8) are all spherical, and respective centers of curvature coincide or basically coincide. Based on the self-collimation principle, the invention quickly determines the position of the center of curvature of the spherical mirror by observing the self-collimation image after the point light source is reflected by the spherical mirror. The assembly and adjustment method provided by the invention has the characteristics of fast assembly and adjustment speed, high precision, low requirements for assembly and adjustment environment and low required equipment cost, and can quickly and effectively complete the assembly and adjustment of the Offner spectral imaging optical system.

1 Claim, 5 Drawing Sheets

(58) Field of Classification Search
USPC .................................. 356/326, 328, 310, 301
See application file for complete search history.

(56) References Cited

U.S. PATENT DOCUMENTS

| | | | | |
|---|---|---|---|---|
| 7,221,449 | B2* | 5/2007 | Boege ................. | G02B 19/0047 |
| | | | | 356/317 |
| 7,330,258 | B2* | 2/2008 | Warren ................. | G01J 3/0208 |
| | | | | 356/328 |
| 7,817,274 | B2* | 10/2010 | Zhang ................... | G01J 3/0256 |
| | | | | 356/328 |
| 8,345,226 | B2* | 1/2013 | Zhang ................... | G01J 3/0264 |
| | | | | 356/40 |
| 8,599,374 | B1* | 12/2013 | Comstock, II ........ | G01J 3/2823 |
| | | | | 356/310 |
| 8,913,241 | B2* | 12/2014 | Bhatia .................... | G01J 3/021 |
| | | | | 356/326 |
| 2004/0184033 | A1* | 9/2004 | Nelson .................. | G01J 3/2823 |
| | | | | 356/302 |
| 2004/0212882 | A1* | 10/2004 | Liang .................... | G02B 30/26 |
| | | | | 359/464 |
| 2006/0038997 | A1* | 2/2006 | Julian ................... | G01J 3/0205 |
| | | | | 356/328 |
| 2007/0296969 | A1* | 12/2007 | Goldstein ................ | G01J 3/14 |
| | | | | 356/328 |
| 2014/0118738 | A1* | 5/2014 | Comstock, II .......... | G01J 3/021 |
| | | | | 29/527.1 |

FOREIGN PATENT DOCUMENTS

| | | |
|---|---|---|
| CN | 103592024 A | 2/2014 |
| CN | 110888240 A | 3/2020 |

* cited by examiner

1, Marking the centers of curvature of the primary mirror, three-mirror, and grating

2, Placing a glass sphere at the center of curvature of the primary mirror, focusing the self-collimating microscope on the center of the sphere, and recording the barycenter coordinate

3, adjusting the primary mirror so that the barycentric coordinate observed by the self-collimating microscope is consistent with that in step 2, and fixing the primary mirror

4, Placing a glass sphere at the center of curvature of the three-mirror, focusing the self-collimating microscope on the center of the sphere, and recording the barycenter coordinate

5, adjusting the three-mirror so that the barycentric coordinate observed by the self-collimating microscope is consistent with that in step 4, and fixing the three-mirror

6, Installing an auxiliary mirror on the back of the grating, and letting the center of curvature of the auxiliary mirror concentric with the curvature center of the grating surface

7, Placing a glass sphere at the center of curvature of the grating, focusing the self-collimating microscope on the center of the sphere, and recording the barycenter coordinate

8, Installing the grating and the auxiliary concave mirror so that the barycenter coordinate of the focal spot reflected by the auxiliary concave mirror observed by the self-collimating microscope is consistent with that in step 7

9, Installing the slit and the detector

10, Using a mercury lamp to illuminate the slit, obtaining a spectral line diagram, and testing the spectral line bending

11, Rotating the grating according to the result of the spectral line bending test, and keeping the barycenter coordinate reflected by the auxiliary concave mirror consistent

12, Fixing the grating, removing the auxiliary mirrot to complete the assembly

FIG. 1

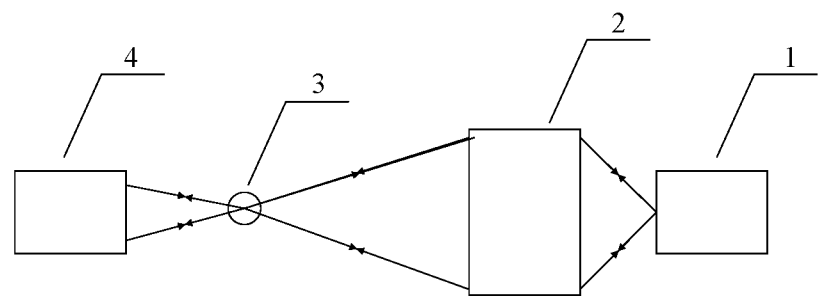
(a)
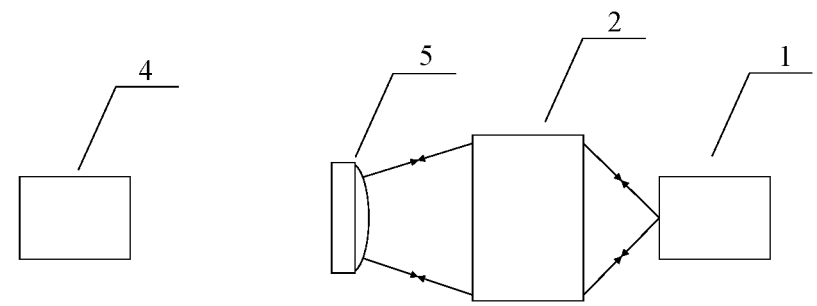
(b)
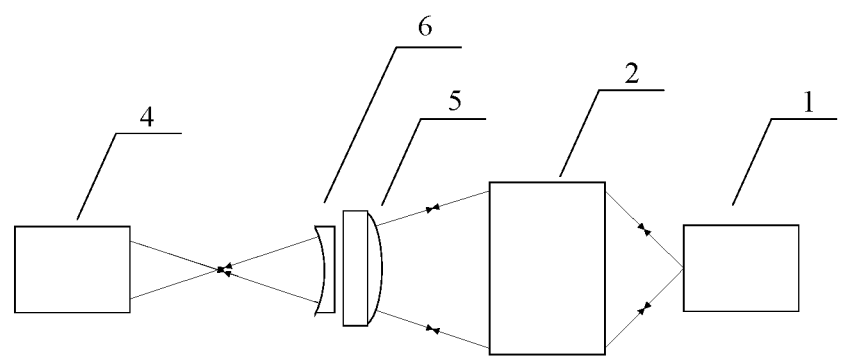
(c)
FIG. 4

FAST ASSEMBLY METHOD OF AN OFFNER SPECTRAL IMAGING OPTICAL SYSTEM

This application is the National Stage Application of PCT/CN2020/088839, filed on May 6, 2020, which claims priority to Chinese Patent Application No. 201911078576.9, filed on Nov. 6, 2019, which is incorporated by reference for all purposes as if fully set forth herein.

FIELD OF THE INVENTION

The present invention relates to a mounting and adjusting method of an Offner type spectral imaging optical system.

BACKGROUND OF THE INVENTION

Spectral imaging technology can acquire spatial information and spectral information of a scene at the same time. It has the advantage of "integration of image and spectrum", and is widely used in the fields of remote sensing detection, mineral exploration, environmental protection monitoring, smart agriculture, food safety and the like. The grating-type spectral imaging system based on the Offner structure has the advantages of large relative aperture, small distortion, good imaging quality and compact structure, and is one of the most common spectral imaging systems at present. The spectral imaging optical system of the Offner structure usually contains components such as a primary mirror, a three-mirror, a convex grating and a slit. The misalignment of these components will cause the imaging quality of the system to decrease and the distortion to increase, which directly affects the quantitative level of spectral imaging.

Before the present invention is made, Chinese invention patent CN102141439A disclosed a method for assembling a convex grating imaging spectrometer, which is based on an interferometer and adopts the direct reading method of spectrograms to realize the assembly of gratings and detectors, and specifically comprises the following steps: equipped with a set of interferometer and a standard compensation mirror; the primary mirror and three-mirror of the convex grating beam splitting system are arranged in front of the interferometer, and interference fringes of the interferometer are caused by adjusting the position of the primary mirror and the three-mirror. A mercury lamp is placed in front of the slit, the grating is placed between the primary mirror and the three-mirror, the reading microscope is placed on the image plane of the convex grating beam splitting system, and the grating is adjusted to make the reading microscope able to read the 0-level and −1 level spectrum of the mercury lamp. The detector and the telescope lens are placed, and the detector and the telescope lens are adjusted so that the detector can receive the ideal spectrum image of the detection target. This method requires the use of an interferometer which is expensive in the mounting and adjusting process, and the mounting and adjusting process takes a long time.

SUMMARY OF THE INVENTION

In view of the deficiencies in the prior art, the present invention provides an Offner type spectral imaging optical system assembly method with fast assembly and adjustment speed, high accuracy, and low cost.

The technical solution to achieve the objective of the present invention is to provide a fast assembly method of an Offner spectral imaging optical system, comprising the following steps:

(1) using a three-coordinate measuring instrument to mark the center of curvature of the primary mirror, the center of curvature of the three-mirror, and the center of curvature of the convex grating surface in the spectral imaging optical system of the Offner structure in advance;

(2) fixing of the primary mirror: placing a transparent glass sphere at the marked center of curvature of the primary mirror, focusing the self-collimating microscope on the center of the glass sphere, and recording the barycenter coordinate D1 of the image points on the image plane of the self-collimating microscope detector; removing the glass sphere, and adjusting the primary mirror so that when the beam emitted by the self-collimating microscope is reflected by the primary mirror, the barycenter coordinate of the image point on the image plane of the self-collimating microscope detector is consistent with the barycenter coordinate D1 of the image point recorded in this step, then fixing the primary mirror;

(3) fixing of the three-mirror: placing a transparent glass sphere at the marked center of curvature of the three-mirror, focusing the self-collimating microscope on the center of the glass sphere, and recording the barycenter coordinate D2 of the image points on the image plane of the self-collimating microscope detector; removing the glass sphere, and adjusting the three-mirror so that when the beam emitted by the self-collimating microscope is reflected by the three-mirror, the barycenter coordinate of the image point on the image plane of the self-collimating microscope detector is consistent with the barycenter coordinate D2 of the image point recorded in this step, then fixing the three-mirror;

(4) installing an auxiliary concave mirror on the back of the convex grating, and the center of curvature of the auxiliary concave mirror is concentric with the center of curvature of the convex grating surface; placing a transparent glass sphere at the marked center of curvature of the convex grating surface, focusing the self-collimating microscope on the center of the glass sphere, and recording the barycenter coordinate D3 of the image points on the image plane of the self-collimating microscope detector; removing the glass sphere, and adjusting the auxiliary concave mirror and the convex grating, so that when the beam emitted by the self-collimating microscope is reflected by the auxiliary concave mirror, the barycenter coordinate of the image point on the image plane of the self-collimating microscope detector is consistent with the barycenter coordinate D3 of the image point recorded in this step;

(5) installing a slit, and placing an area array detector at the image surface of the spectral imaging optical system; illuminating the slit with a mercury lamp, obtaining a spectral line diagram in the area array detector, and testing the spectral line bending; when reflected by the auxiliary concave mirror on the back of the convex grating, keeping the barycenter coordinate of the image point on the image plane of the self-collimating microscope detector consistent with the barycenter coordinate in step (4), and rotating the convex grating according to the result of the spectral line bending test;

(6) when the spectral line bending meets the requirement, fixing the convex grating, and removing the auxiliary concave mirror to complete the system installation and adjustment.

The Offner type spectral imaging optical system is a concentric or nearly concentric optical system, that is, its primary mirror, convex grating, and three-mirror are all spherical, and their respective centers of curvature coincide or substantially coincide. The invention is based on the principle of self-collimation, and quickly determines the position of the center of curvature of the spherical mirror by observing the self-collimating image obtained after the point light source is reflected by the spherical mirror.

Compared with the prior art, in view of the optical structure characteristics of the Offner-type spectral imaging optical system, the present invention proposes an assembly and adjustment method based on the principle of self-collimation. Its beneficial effects are: fast assembly and adjustment speed and high accuracy. The requirements for the installation and adjustment environment are low, and the required equipment costs are low, and the installation and adjustment of the Offner type spectral imaging optical system can be completed quickly and effectively.

BRIEF DESCRIPTION OF THE DRAWINGS

FIG. 1 is a flowchart of an Offner type spectral imaging optical system installation and adjustment method according to an embodiment of the method.

FIG. 4 is a schematic diagram of the installation of the convex grating and auxiliary mirror.

Figure 2:
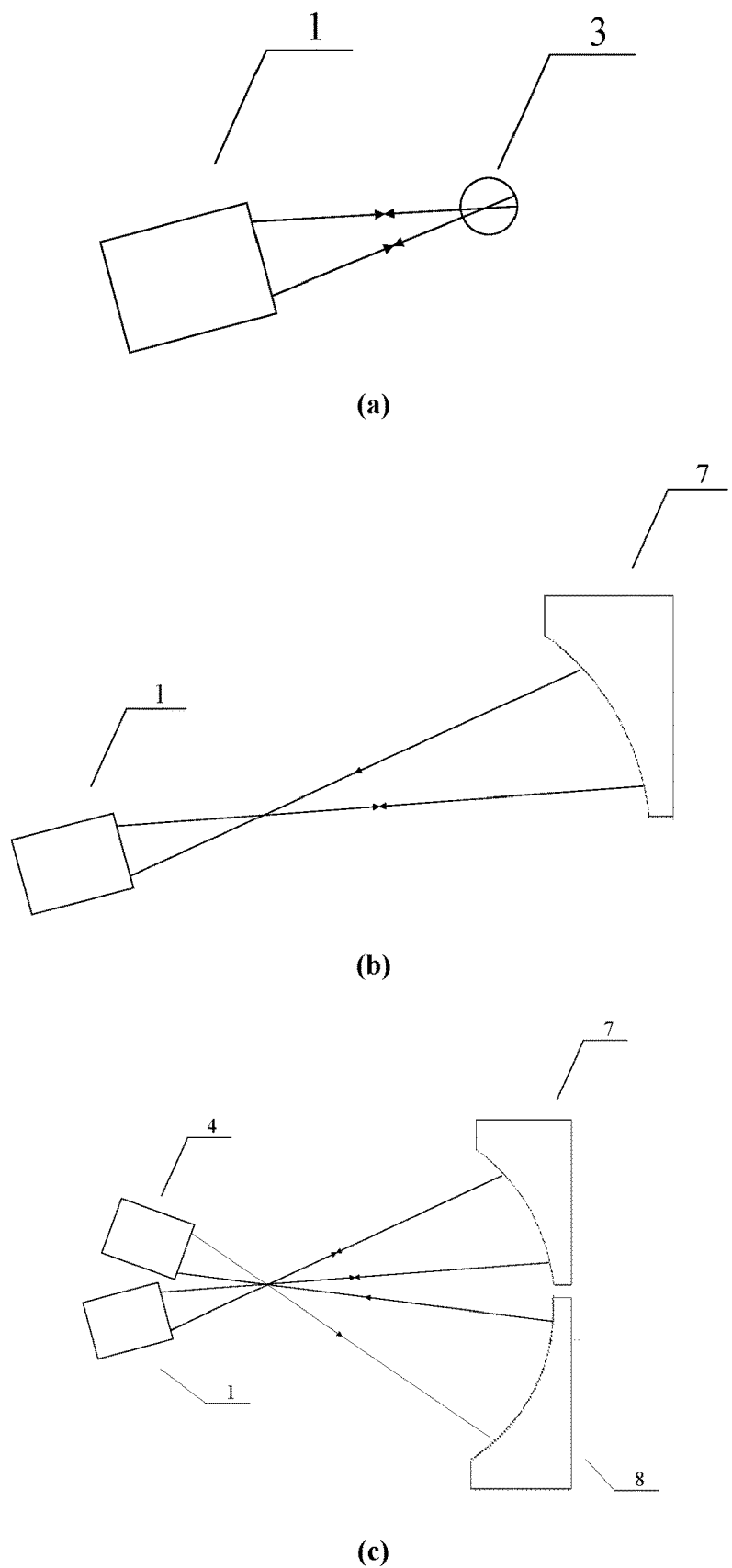
FIG. 2 is a schematic diagram of the installation and adjustment of the primary mirror and the three-mirror.

In the figure, 1. Auto-collimating microscope; 2. Compensating lens; 3. Glass sphere; 4. Self-collimating microscope; 5. Convex grating; 6. Auxiliary mirror; 7. Primary mirror of the spectral imaging system; 8. Three-mirror of the spectral imaging system; 9. Slit; 10. Mercury lamp; 11. CCD camera; 12. Semi-transparent and semi-reflective mirror; 13. Microscope objective; 14. Light source; 15. Area array detector; 16. Pinhole.

DETAILED DESCRIPTION OF THE INVENTION

The technical solution of the present invention will be further described in detail below in conjunction with the drawings and embodiments.

Embodiment 1

Refer to FIG. 1, which is a flowchart of an Offner type spectral imaging optical system installation and adjustment method provided in this embodiment. The specific steps are as follows:

1. Using a three-coordinate measuring instrument, and marking the center of curvature of the primary mirror, the center of curvature of the three-mirror, and the center of curvature of the convex grating surface in the spectral imaging optical system of the Offner structure in advance;
2. Placing a transparent glass sphere at the center of curvature of the marked primary mirror, focusing the self-collimating microscope on the center of the glass sphere, and recording the barycenter coordinate of the image points on the image plane of the self-collimating microscope detector;
3. Removing the glass sphere, and adjusting the primary mirror so that when the beam emitted by the self-collimating microscope is reflected by the primary mirror, the barycentric coordinate of the image point on the image plane of the self-collimating microscope detector is consistent with the barycentric coordinates of the image point recorded in step 2, and fixing the primary mirror;
4. Placing a transparent glass sphere at the center of curvature of the marked three-mirror, focusing the self-collimating microscope on the center of the glass sphere, and recording the barycenter coordinate of the image points on the image plane of the self-collimating microscope detector;
5. Removing the glass sphere, and adjusting the three-mirror so that when the beam emitted by the self-collimating microscope is reflected by the three-mirror, the barycentric coordinate of the image point on the image plane of the self-collimating microscope detector is consistent with the barycentric coordinates of the image point recorded in step 4, and fixing the three-mirror;
6. Installing an auxiliary concave mirror on the back of the convex grating, and the curvature center of the auxiliary concave mirror is concentric with the curvature center of the convex grating surface;
7. Placing a transparent glass sphere at the marked center of curvature of the convex grating surface, focusing the self-collimating microscope on the center of the glass sphere, and recording the barycenter coordinate of the image points on the image plane of the self-collimating microscope detector;
8. Removing the glass sphere, and adjusting the auxiliary concave mirror and convex grating so that when the beam emitted by the self-collimating microscope is reflected by the auxiliary concave mirror, the barycentric coordinate of the image point on the image plane of the self-collimating microscope detector is consistent with the barycentric coordinate of the image point recorded in step 7;
9. Installing a slit and placing an area array detector on the image plane of the spectral imaging optical system;
10. Using a mercury lamp to illuminate the slit, obtaining a spectral line diagram on the area array detector, and testing the spectral line bending;
11. When reflected by the auxiliary concave mirror on the back of the convex grating, keeping the barycenter coordinate of the image point on the image plane of the self-collimating microscope detector consistent with the barycenter coordinate in step 7, and rotating the convex grating according to the result of the spectral line bending test;
12. When the spectral line bending meets the requirements, fixing the convex grating and removing the auxiliary concave mirror to complete the system installation and adjustment.

Refer to FIG. 2, which is a schematic diagram of the assembly and adjustment of the primary mirror and the three-mirror; in the figure, 7 is the primary mirror of the spectral imaging system, and 8 is the three-mirror of the spectral imaging system. The specific steps are shown in FIGS. 2(a), (b) and (c), respectively;

Refer to FIG. 2(a), first aligning the self-collimating microscope 1 with the center of the glass sphere 3 when setting up.

Referring to FIG. 2(b), removing the glass sphere, putting the primary mirror 7 into the optical path, adjusting the primary mirror 3 so that the light emitted by the self-collimating microscope 1 can be self-collimated after being reflected by the primary mirror, and fixing the primary mirror;

Referring to FIG. 2 (c), using the same method as FIG. 2 (a), installing another self-collimating microscope 4 so that its convergence point coincides with the center of curvature of the glass sphere 3, and then putting three-mirror 8 in the optical path. Adjusting the three-mirror 8 so that the light emitted by the self-collimating microscope 4 can be self-collimated after being reflected by the three-mirror. Fixing the three-mirror to complete the installation of the primary mirror and the three-mirror.

Figure 3:
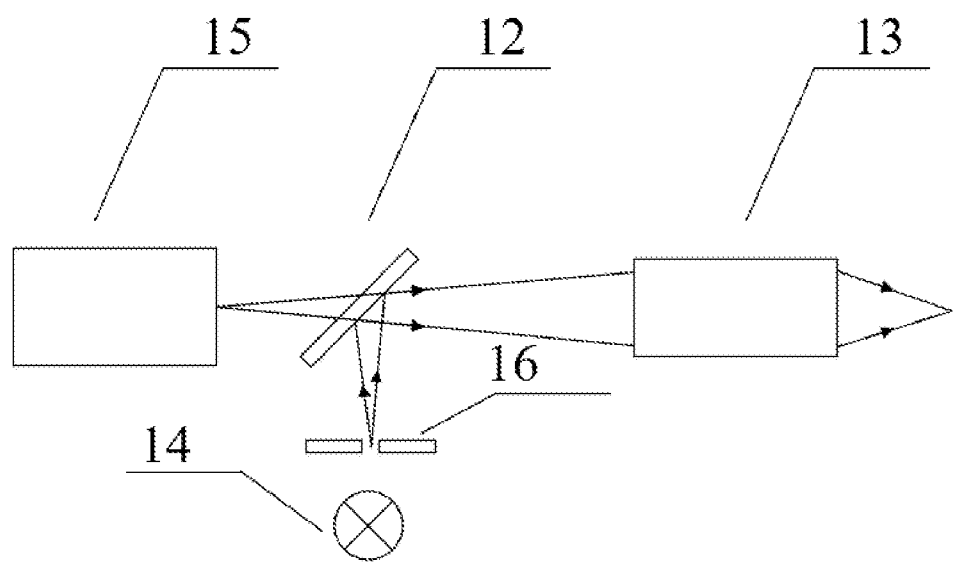
FIG. 3 is a schematic diagram of the structure of an self-collimating microscope.

Refer to FIG. 3, which is a schematic diagram of the structure of the self-collimating microscope used in the assembly and adjustment process. In the figure, 12 is a semi-transparent and semi-reflective mirror, 13 is a microscope objective lens, 14 is a light source, and 15 is an area array detector. 16 is a pinhole. The position of the pinhole 16 and the center position of the detector 15 are in a conjugate relationship, and both are located at the image point of the microscope objective lens.

Refer to FIG. 4, which is a schematic diagram of the installation of a convex grating and an auxiliary mirror. In the figure, 1 and 4 are self-collimating microscopes, 2 is a compensating lens that generates concentrated light, 3 is a glass sphere, and 5 is a convex grating. 6 is the auxiliary mirror with concave reflective surface. The specific steps are shown in FIGS. 4(a), (b) and (c):

See FIG. 4(a). When installing, first aligning the convergence point of the self-collimating microscope 4 with the center of the glass sphere 3, and then putting the compensating lens 2 into the optical path so that the object converging point of the compensating lens 2 is at the center of the glass sphere 3, and using the self-collimating microscope 4 to align the image converging point of the compensating lens 2.

As in FIG. 4(b), removing the glass sphere, putting the convex grating 5 into the optical path, moving the convex grating so that the center of curvature of the convex grating coincides with the convergence point of the compensation mirror 2, and the 0-level light returned by the convex grating 5 can be observed in the self-collimating microscope 4.

Referring to FIG. 4(c), an auxiliary mirror 6 is placed in the optical path, the auxiliary mirror is adjusted so that its center of curvature coincides with the convergence point of the self-collimating microscope 4, and the auxiliary mirror and convex grating are fixed to complete the convex grating and auxiliary mirror. installation.

Figure 5:
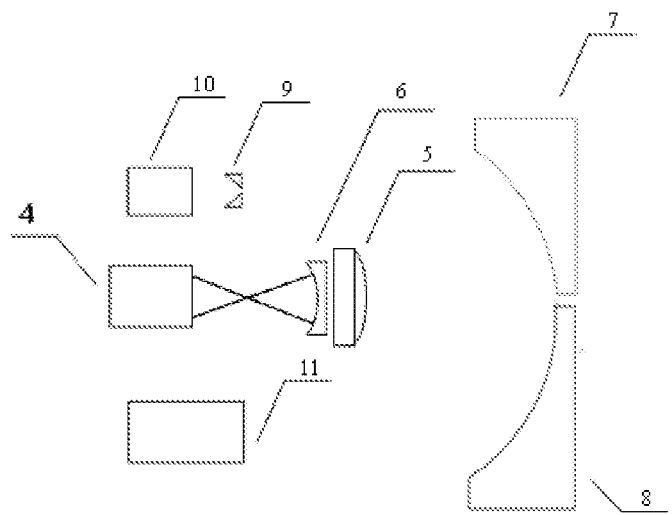
FIG. 5 is a schematic diagram of coarse assembly and adjustment of the grating.
Figure 6:
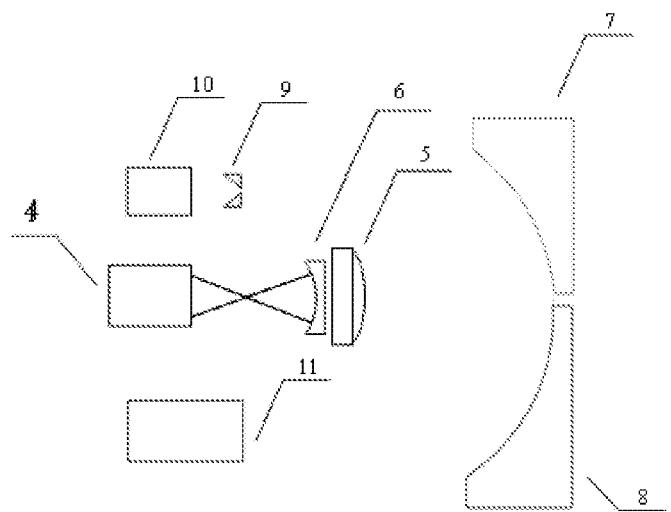
FIG. 6 is a schematic diagram of fine adjustment of the grating.

Referring to FIGS. 5 and 6, FIG. 5 is a schematic diagram of the coarse adjustment of the grating; the convergence point of the self-collimating microscope 4 is located at the center of curvature of the primary mirror 7 and the three-mirror 8, and place convex grating 5 and concave auxiliary mirror 6 together. Adjust the convex grating so that the center of curvature of the auxiliary mirror at the rear is at the convergence point of the self-collimating microscope 4, and initially fix the convex grating. FIG. 6 is a schematic diagram of the fine adjustment of the grating; install the slit 9 of the spectral imaging system, and use the mercury lamp 10 to illuminate the slit, and install the CCD camera 11 on the image plane of the spectral imaging system, so that clearly spectrum line can be observed on the area array detector. Measure the curvature of the spectral line on the area array detector, rotate the convex grating while ensuring that the center of curvature of the auxiliary mirror is still at the focal point of the self-collimating microscope 4, until the curvature of the spectral line is minimal, fix the convex grating, and remove the auxiliary mirror to complete the installation and adjustment of Offner spectral imaging system.

What we claim:

1. A fast assembly method of an Offner spectral imaging optical system, which is characterized by comprising the following steps:
    (1) using a three-coordinate measuring instrument to mark the center of curvature of the primary mirror, the center of curvature of the three-mirror, and the center of curvature of the convex grating surface in the spectral imaging optical system of the Offner structure in advance;
    (2) fixing of the primary mirror: placing a transparent glass sphere at the marked center of curvature of the primary mirror, focusing the self-collimating microscope on the center of the glass sphere, and recording the barycenter coordinate D1 of the image points on the image plane of the self-collimating microscope detector; removing the glass sphere, and adjusting the primary mirror so that when the beam emitted by the self-collimating microscope is reflected by the primary mirror, the barycenter coordinate of the image point on the image plane of the self-collimating microscope detector is consistent with the barycenter coordinate D1 of the image point recorded in this step, then fixing the primary mirror;
    (3) fixing of the three-mirror: placing a transparent glass sphere at the marked center of curvature of the three-mirror, focusing the self-collimating microscope on the center of the glass sphere, and recording the barycenter coordinate D2 of the image points on the image plane of the self-collimating microscope detector; removing the glass sphere, and adjusting the three-mirror so that when the beam emitted by the self-collimating microscope is reflected by the three-mirror, the barycenter coordinate of the image point on the image plane of the self-collimating microscope detector is consistent with the barycenter coordinate D2 of the image point recorded in this step, then fixing the three-mirror;
    (4) installing an auxiliary concave mirror on the back of the convex grating, and the center of curvature of the auxiliary concave mirror is concentric with the center of curvature of the convex grating surface; placing a transparent glass sphere at the marked center of curvature of the convex grating surface, focusing the self-collimating microscope on the center of the glass sphere, and recording the barycenter coordinate D3 of the image points on the image plane of the self-collimating microscope detector; removing the glass sphere, and adjusting the auxiliary concave mirror and the convex grating, so that when the beam emitted by the self-collimating microscope is reflected by the auxiliary concave mirror, the barycenter coordinate of the image point on the image plane of the self-collimating microscope detector is consistent with the barycenter coordinate D3 of the image point recorded in this step;
    (5) installing a slit, and placing an area array detector at the image surface of the spectral imaging optical system; illuminating the slit with a mercury lamp, obtaining a spectral line diagram in the area array detector, and testing the spectral line bending; when reflected by the auxiliary concave mirror on the back of the convex grating, keeping the barycenter coordinate of the image point on the image plane of the self-collimating microscope detector consistent with the barycenter coordinate in step (4), and rotating the convex grating according to the result of the spectral line bending test;

(6) when the spectral line bending meets the requirement, fixing the convex grating, and removing the auxiliary concave mirror to complete the system installation and adjustment.

\* \* \* \* \*